(12) United States Patent
Poiesz et al.

(10) Patent No.: US 8,886,933 B1
(45) Date of Patent: Nov. 11, 2014

(54) STREAMLINED PROVISIONING AND CONFIGURATION OF COMPUTING DEVICES

(71) Applicant: Google Inc., Mountain View, CA (US)

(72) Inventors: Benjamin Poiesz, Mountain View, CA (US); Andrew Abramson, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/108,691

(22) Filed: Dec. 17, 2013

(51) Int. Cl.
*H04L 29/00* (2006.01)
*H04W 12/06* (2009.01)
*H04W 8/24* (2009.01)

(52) U.S. Cl.
CPC ............ *H04W 8/245* (2013.01); *H04W 12/06* (2013.01)
USPC .................. 713/164; 726/1; 726/3; 709/214; 705/40; 455/410; 455/411; 370/313

(58) Field of Classification Search
USPC ........................................................ 713/164
See application file for complete search history.

(56) References Cited

U.S. PATENT DOCUMENTS

| 5,555,286 | A | * | 9/1996 | Tendler ...................... 455/404.2 |
|---|---|---|---|---|
| 6,615,404 | B1 | * | 9/2003 | Garfunkel et al. ............ 717/173 |
| 7,438,217 | B2 | | 10/2008 | Bhella et al. |
| 7,802,082 | B2 | | 9/2010 | Kruse et al. |
| 8,315,198 | B2 | | 11/2012 | Corneille et al. |
| 2001/0044832 | A1 | * | 11/2001 | Cohn et al. ...................... 709/217 |
| 2008/0025243 | A1 | * | 1/2008 | Corneille et al. ............. 370/313 |
| 2010/0103851 | A1 | * | 4/2010 | Chintada et al. .............. 370/312 |
| 2011/0004549 | A1 | * | 1/2011 | Gray et al. ....................... 705/40 |
| 2011/0287716 | A1 | * | 11/2011 | Lortz ............................ 455/41.1 |
| 2012/0101952 | A1 | * | 4/2012 | Raleigh et al. ................ 705/304 |
| 2012/0252405 | A1 | * | 10/2012 | Lortz et al. ..................... 455/410 |
| 2012/0317019 | A1 | * | 12/2012 | Carnes ............................ 705/39 |
| 2013/0042295 | A1 | * | 2/2013 | Kelly et al. ........................ 726/1 |
| 2013/0111347 | A1 | * | 5/2013 | Reilly et al. ................... 715/716 |
| 2013/0122867 | A1 | * | 5/2013 | Bayliss et al. ................ 455/411 |
| 2014/0020062 | A1 | * | 1/2014 | Tumula et al. ..................... 726/3 |

* cited by examiner

*Primary Examiner* — Beemnet Dada
*Assistant Examiner* — Sayed Beheshti Shirazi
(74) *Attorney, Agent, or Firm* — McDonnell Boehnen Hulbert & Berghoff LLP

(57) ABSTRACT

Methods and systems for provisioning a computing device are provided. An example method may include receiving, by a computing device, information indicating a uniform resource identifier (URI) and a wireless access point configured to allow the computing device to connect to a wireless network to enable the computing device to access the URI. The method may also include downloading, onto the computing device, a provisioning software application from the URI. The method may also include executing the provisioning software application on the computing device, wherein the provisioning software application is configured to provision the computing device such that the provisioned computing device is configured to operate in a limited function mode. The method may also include locking the provisioned computing device to prevent changes to the limited function mode.

17 Claims, 7 Drawing Sheets

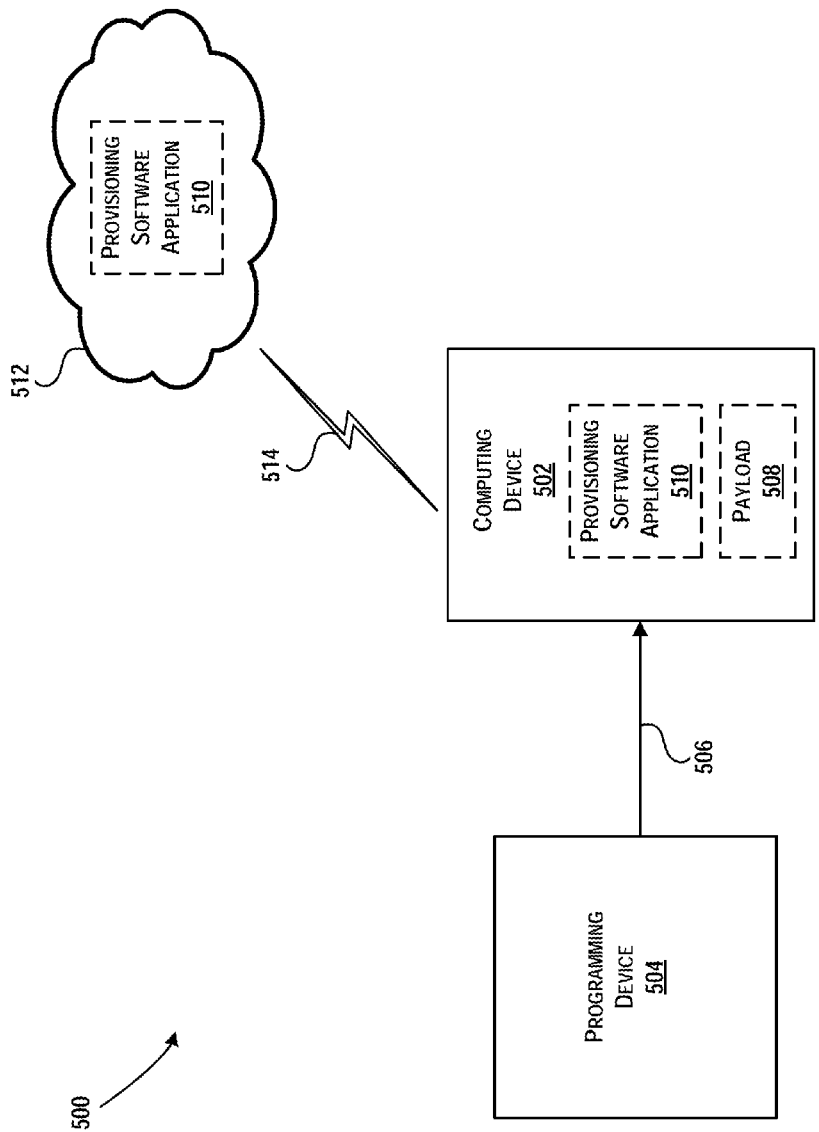

STREAMLINED PROVISIONING AND CONFIGURATION OF COMPUTING DEVICES

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, among many other types of computing devices, are increasingly prevalent in numerous aspects of modern life. Such computing devices may be provisioned during setup with a particular set of functionality. An organization may desire to quickly provision multiple computing devices with a particular set of functionality and lock the provisioned computing device to that particular set of functionality.

SUMMARY

In one example, a method for provisioning a computing device is described. The method may include receiving, by a computing device, information indicating a uniform resource identifier (URI) and a wireless access point configured to allow the computing device to connect to a wireless network to enable the computing device to access the URI. The method may also include downloading, onto the computing device, a provisioning software application from the URI. The method may also include executing the provisioning software application on the computing device, wherein the provisioning software application is configured to provision the computing device such that the provisioned computing device is configured to operate in a limited function mode. The limited function mode may comprise at least a list of software applications allowed on the computing device, restricting a functionality of one or more software applications on the computing device and preventing a removal of one or more software applications on the computing device. The method may also include locking the provisioned computing device to prevent changes to the limited function mode.

In yet another aspect, a non-transitory computer readable memory having stored therein instructions executable by a computing device to cause the computing device to perform functions is described. The functions may include receiving information indicating a uniform resource identifier (URI) and a wireless access point configured to allow the computing device to connect to a wireless network to enable the computing device to access the URI. The functions may also include downloading a provisioning software application from the URI. The functions may also include executing the provisioning software application, wherein the provisioning software application is configured to provision the computing device such that the provisioned computing device is configured to operate in a limited function mode. The limited function mode may comprise at least a list of software applications allowed on the computing device, restricting a functionality of one or more software applications on the computing device and preventing a removal of one or more software applications on the computing device. The functions may also include locking the provisioned computing device to prevent changes to the limited function mode.

In another embodiment, a system is described. The system may include one or more processors, and data storing instructions that, when executed by the one or more processors, cause the system to perform functions. The functions may include receiving information indicating a uniform resource identifier (URI) and a wireless access point configured to allow the computing device to connect to a wireless network to enable the computing device to access the URI. The functions may also include downloading a provisioning software application from the URI. The functions may also include executing the provisioning software application, wherein the provisioning software application is configured to provision the system such that the provisioned computing device is configured to operate in a limited function mode. The limited function mode may comprise at least a list of software applications allowed on the computing device, restricting a functionality of one or more software applications on the computing device and preventing a removal of one or more software applications on the computing device. The functions may also include locking the provisioned computing device to prevent changes to the limited function mode.

In yet another example, a system is provided that includes a means for receiving, by a computing device, information indicating a uniform resource identifier (URI) and a wireless access point configured to allow the computing device to connect to a wireless network to enable the computing device to access the URI. The system also includes a means for downloading, onto the computing device, a provisioning software application from the URI. The system also includes a means for executing the provisioning software application on the computing device, wherein the provisioning software application is configured to provision the computing device such that the provisioned computing device is configured to operate in a limited function mode. The limited function mode may comprise at least a list of software applications allowed on the computing device, restricting a functionality of one or more software applications on the computing device and preventing a removal of one or more software applications on the computing device. The system also includes a means for locking the provisioned computing device to prevent changes to the limited function mode.

These as well as other aspects, advantages, and alternatives, will become apparent to those of ordinary skill in the art by reading the following detailed description, with reference where appropriate to the accompanying figures.

BRIEF DESCRIPTION OF THE FIGURES

FIG. 5 illustrates an example system for provisioning a computing device, in accordance with at least some embodiments described herein.

DETAILED DESCRIPTION

Figure 1:
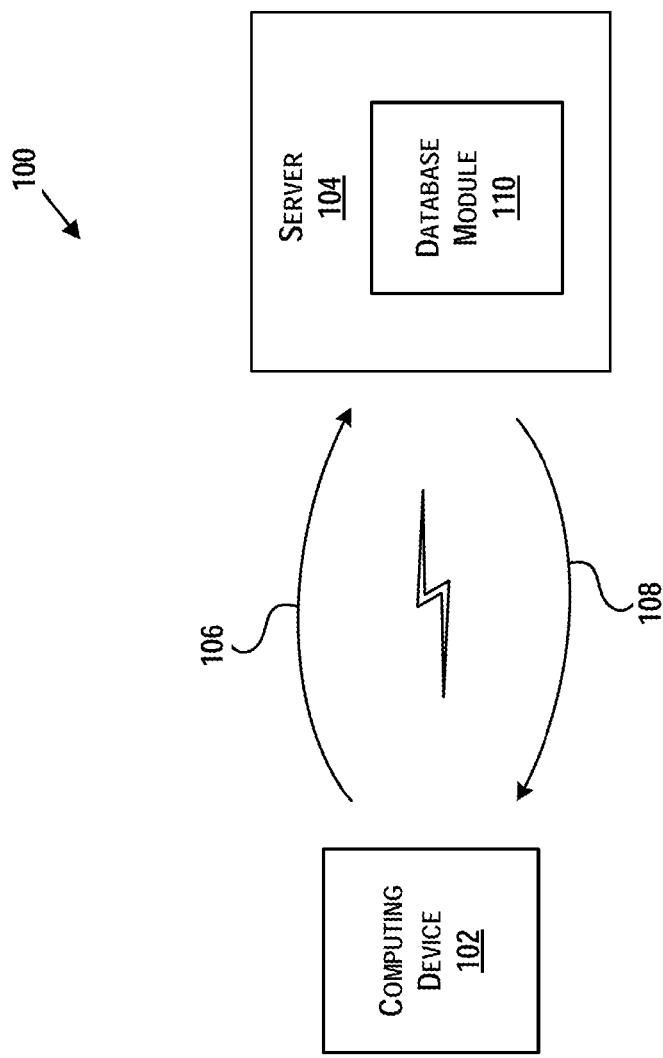
FIG. 1 illustrates an example communication system by which an example method may be implemented.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

Computing devices such as personal computers, laptop computers, tablet computers, cellular phones, among many other types of computing devices, are increasingly prevalent in numerous aspects of modern life. An organization may desire to provision a computing device with a particular set of functionality and lock the provisioned computing device to that particular set of functionality. For example, an internet café may desire to have a tablet computer available for use by its customers. However, the internet café may not want its customers to be able to add any software applications on the tablet, or reconfigure the tablet in any way. In another example, a company may provide cellular phones to all of its employees. The company may desire to provision multiple cellular phones with particular software applications, or limit the functionality of the cellular phone to a particular use case. Therefore, a method and system for configuring a computing device in a limited function mode and locking the computing device to prevent changes to the limited function mode may be desirable.

Thus, within examples herein, a method is provided for provisioning a computing device that includes receiving, by the computing device, information indicating a uniform resource identifier (URI) and a wireless access point configured to allow the computing device to connect to a wireless network to enable the computing device to access the URI. The method may then include downloading, onto the computing device, a provisioning software application from the URI. Next, the method may include executing the provisioning software application on the computing device, wherein the provisioning software application is configured to provision the computing device such that the provisioned computing device is configured to operate in a limited function mode. The limited function mode may comprise a list of software applications allowed on the computing device, restricting a functionality of one or more software applications on the computing device, and preventing a removal of one or more software applications on the computing device, as examples. The method may then include locking the provisioned computing device to prevent changes to the limited function mode.

It should be understood that the above examples are provided for illustrative purposes, and should not be construed as limiting. As such, the method additionally or alternatively includes other steps or includes fewer steps, without departing from the scope of the invention.

Referring now to the figures, FIG. 1 illustrates an example communication system 100 by which an example method may be implemented. The system 100 includes a computing device 102 that may communicate with a server 104 via one or more wired and/or wireless interfaces. The computing device 102 and the server 104 may communicate within a network. Alternatively, the computing device 102 and the server 104 may each reside within a respective network.

The computing device 102 may be any type of computing device or transmitter including a laptop computer, a mobile telephone, or tablet computing device, etc., that is configured to transmit data 106 to, or receive data 108 from, the server 104 in accordance with the method and functions described herein. The computing device 102 may include a user interface, a communication interface, a processor, and data storage comprising instructions executable by the processor for carrying out one or more functions relating to the data sent to, or received by, the server 104. The user interface may include buttons, a touchscreen, a microphone, and/or any other elements for receiving inputs, as well as a speaker, one or more displays, and/or any other elements for communicating outputs.

The server 104 may be any entity or computing device arranged to carry out the method and computing device functions described herein. Server 104 may include the same components as computing device 102. Further, the server 104 may be configured to send data 108 to or receive data 106 from the computing device 102. The server 104 may have a database module 110 configured to store a number of applications, music, electronic books, etc., for purchase and/or download by various computing devices. The database module 110 may thus include a digital distribution platform for applications, online electronic data, or other digital media.

The data 106 received by the server 104 from the computing device 102 may take various forms. For example, the computing device 102 may request applications to be downloaded from the server 104. The data 108 sent to the computing device 102 from the server 104 may also take various forms. For example, the server 104 may send to the computing device 102 any requested applications, system libraries, updates to operating systems, etc.

Figure 2:
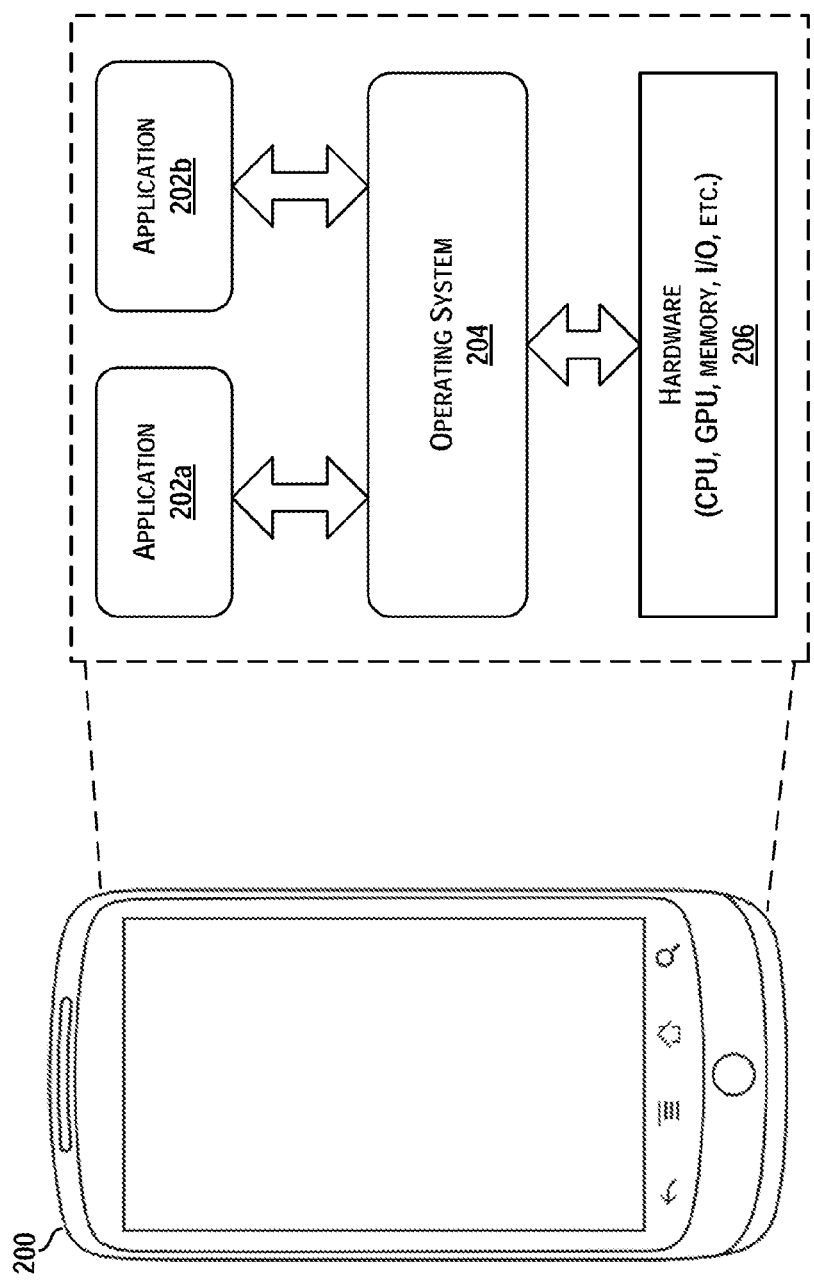
FIG. 2 illustrates an example computing device by which an example method may be implemented.

FIG. 2 illustrates an example computing device 200 by which an example method may be implemented. Computing device 200 may include applications 202a and 202b and an operating system 204 being executed by hardware 206. Although the example computing device 200 is a smartphone, aspects of this disclosure are applicable to other computing devices such as PCs, laptops, tablet computers, etc.

Each of the applications 202a and 202b may include instructions that when executed cause the computing device 200 to perform specific tasks or functions. Applications 202a and 202b may be native applications (i.e., installed by a manufacturer of the computing device 200 and/or a manufacturer of the operating system 204) or may be a third-party application installed by a user of the computing device 200 after purchasing the computing device. A non-exhaustive list of example applications includes: a media player application that accepts media files as inputs and generates corresponding video and/or audio to the output device(s); an e-reader application which accepts electronic documents (books, magazines, etc.) as input and presents the content of the document via the output device(s); a feed reader that accepts feeds delivered over the Internet (e.g., RSS feeds and/or feeds from social network sites) as input and presents the feeds via the output device(s); a map application that displays a map via the output device(s); a note-taking application, a bookmarking application, and a word processing, spreadsheet, and/or presentation application that accepts specifically formatted files as inputs and presents them via the output devices for viewing and/or editing.

The operating system 204 may interact with and manage hardware 206 to provide services for the applications 202a and 202b. For example, an application 202a may request that the operating system 204 direct an integrated camera of hardware 206 to capture a visual image and that the hardware 206 store the image to memory.

The hardware 206 may include, for example, a central processing unit (CPU), a graphics processor (GPU), memory, an input/output (I/O) interface, user input device(s), output device(s), or other sensors. Components of hardware 206 may be controlled by instructions contained in applications 202a and 202b and operating system 204.

The central processing unit (CPU) may be operable to effectuate the operation of the computing device 200 by executing instructions stored in memory or disk storage. Such instructions may include the operating system 204 and the applications 202a and 202b. The CPU may, for example, comprise a single or multi-core processor, an application specific integrated circuit (ASIC), field programmable gate array (FPGA), and/or any other suitable circuitry.

The graphics processor may be operable to generate a video stream for output to the screen based on instructions and/or data received from the CPU. That is, data structures corresponding to images to be displayed on the screen may be stored to and read from the memory or disk storage by the CPU. The CPU may convey such data structures to the graphics processor via a standardized application programming interface (API) such as, for example, Standard Widget Toolkit (SWT), the DirectX Video Acceleration API, the Video Decode Acceleration Framework API, or other suitable API.

The memory may include program memory and run-time memory. The memory may, for example, comprise non-volatile memory, volatile memory, read only memory (ROM), random access memory (RAM), flash memory, magnetic storage, and/or any other suitable memory (which may be non-transitory media). Program memory may store instructions executable by the CPU to effectuate operation of the operating system 204 and the applications 202a and 202b. Runtime memory may store data generated or used during execution of the operating system 204 or applications 202a and 202b.

The input/output (I/O) interface may be operable to receive signals from the input device(s), and provide corresponding signals to the CPU and/or the graphics processor, for example.

The input device(s) may include, for example, a mouse, a touchpad, a motion sensor, a trackball, a voice recognition device, a keyboard, or any other suitable input device which enables a user to interact with the computing device 200.

The output devices may include, for example, a screen and speakers. The screen may be, for example, a liquid crystal display (LCD) screen, an organic light emitting diode (OLED) screen, an e-ink screen, and/or any other suitable device for presenting a graphical user interface.

Figure 3:
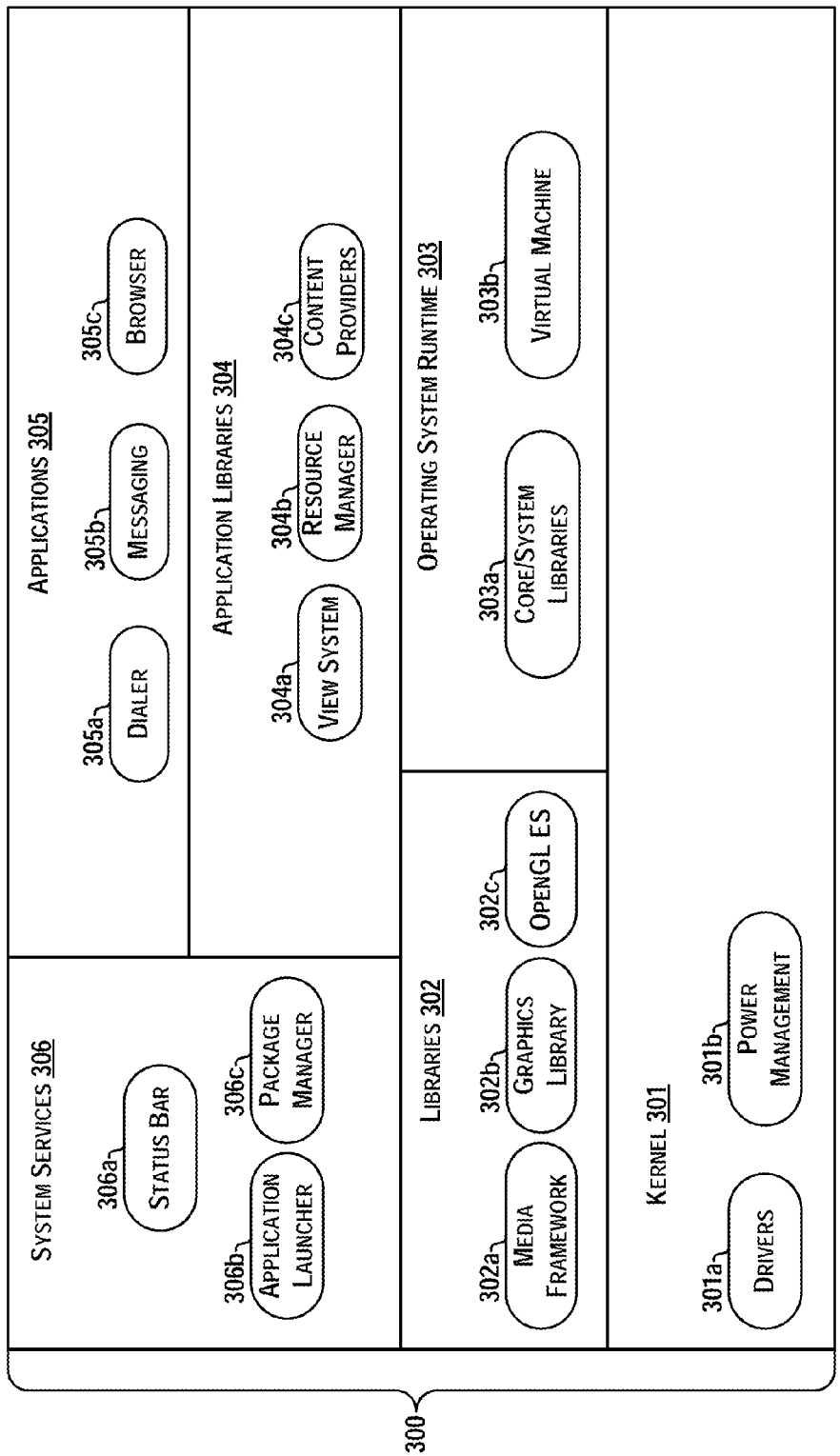
FIG. 3 is a block diagram illustrating example components of an operating system used by a computing device.

FIG. 3 is a block diagram illustrating possible components of an operating system 300 used by a computing device. The operating system 300 may invoke multiple processes, while ensuring that an associated phone application is responsive, and that wayward applications do not cause a fault of the operating system 300. Using task switching, the operating system 300 may allow for the switching of applications while on a telephone call, without losing the state of each associated application. The operating system 300 may use an application framework to enable reuse of components, and provide a scalable experience by combining pointing device and keyboard inputs and by allowing for pivoting. The operating system 300 may generally be organized into components including a kernel 301, libraries 302, an operating system runtime 303, application libraries 304, applications 305, and system services 306.

The kernel 301 may include drivers 301a that enable software such as the operating system 300 and applications 306 to interact with input/output devices. The kernel 301 may also include power management processes 301b that coordinate hardware power usage and provide alerts when an integrated battery is running low on power, for example.

The libraries 302 may include several subcomponents, such as media framework 302a, graphics library 302b, and OpenGL ES 302c. The media framework 302a may include functionality that supports standard video, audio and still-frame formats. The graphics library 302b may support two-dimensional application drawing. The OpenGL ES 302c may support gaming and three-dimensional graphics rendering.

The operating system runtime 303 may include core libraries 303a and virtual machines 303b. The virtual machines 303b may be custom virtual machines that run a customized file format. The virtual machines 303b may be used with an embedded environment since the virtual machines 303b use runtime memory efficiently, implement a CPU optimized bytecode interpreter, and support multiple virtual machine processes per device.

The application libraries 304 may include libraries for view system 304a, resource manager 304b, and content providers 304c. These application libraries may provide support for applications 305.

The applications 305 may include any number of applications, such as a dialer 305a, messaging 305b, and a browser 305c. The dialer 305a may provide functionality related to placing or receiving phone calls. The messaging 305b may provide functionality related to receiving and sending messages, such as email, voice mail, or text messages. The browser 305c may provide functionality related to sending or receiving information via the world wide web.

The system services 306 may include status bar 306a, application launcher 306b, and package manager 306c. The status bar 306a may provide functionality related to providing system notifications. The application launcher 306b may provide functionality related to organization and execution of applications 305. The package manager 306c may maintain information for installed applications 305.

Figure 4A:
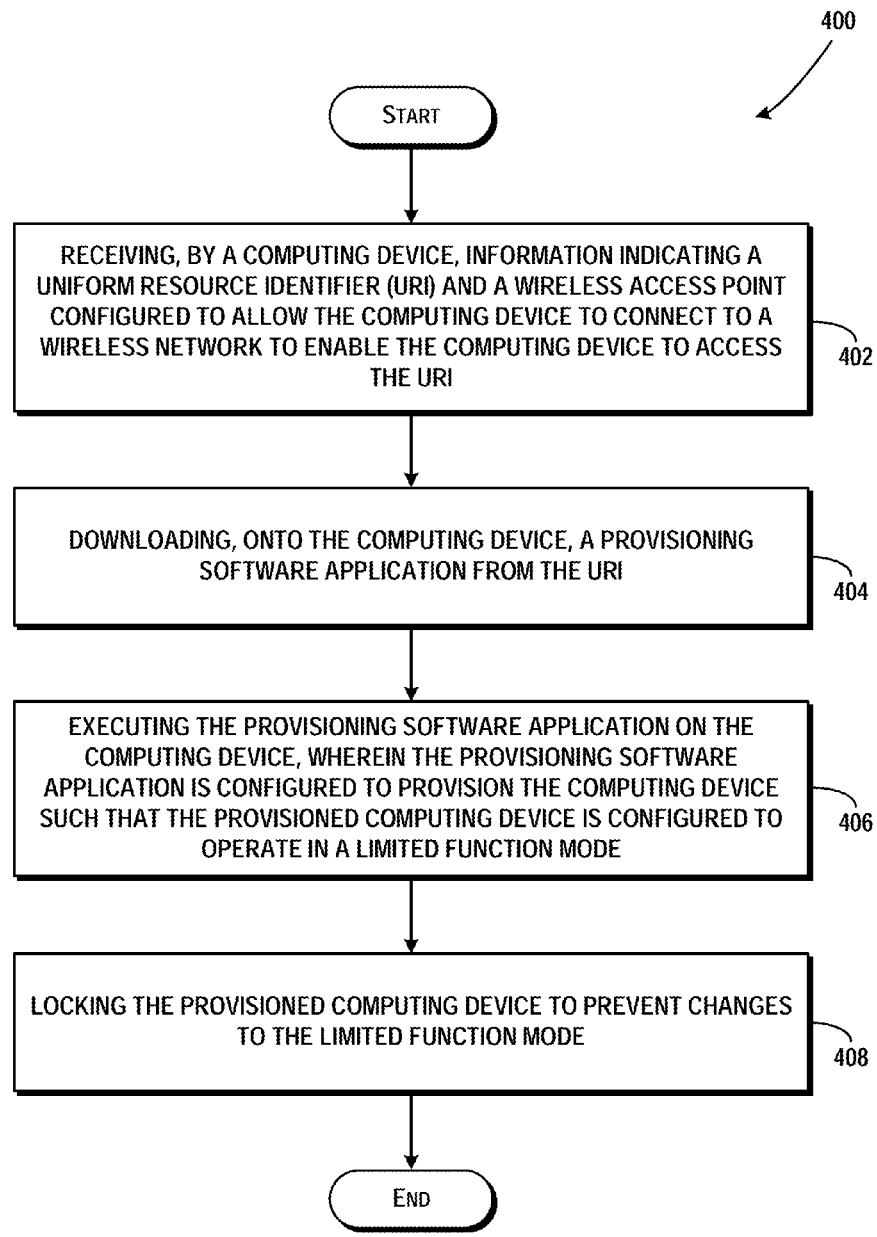
FIG. 4A is a block diagram of an example method for provisioning a computing device, in accordance with at least some embodiments described herein.

FIG. 4A is a block diagram of an example method 400 for provisioning a computing device, in accordance with at least some embodiments described herein. Method 400 shown in FIG. 4A presents an embodiment of a method that, for example, could be used with a computing device, such as the computing device illustrated in FIGS. 1-2. Method 400 may include one or more operations, functions, or actions as illustrated by one or more blocks of 402-408. Although the blocks are illustrated in a sequential order, these blocks may in some instances be performed in parallel, and/or in a different order than those described herein. Also, the various blocks may be combined into fewer blocks, divided into additional blocks, and/or removed based on the desired implementation.

In addition, for the method 400 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example. The program code (or data for the code) may also be stored or provided on other media including communication media, such as a wireless communication media, for example.

In addition, for the method 400 and other processes and methods disclosed herein, each block in FIG. 4A may represent circuitry that is wired to perform the specific logical functions in the process. Functions of the method 400 may be fully performed by a computing device, or may be distributed across multiple computing devices and/or a server (e.g., as shown in FIG. 1). The computing device may have an operating system, such as the operating system 300 in FIG. 3, and the computing device may also have a system library accessible by the operating system. Other example configurations of the computing device are also possible for performing the method 400 in FIG. 4A.

At block 402, the method 400 includes receiving, by a computing device, information indicating a uniform resource identifier (URI) and a wireless access point configured to allow the computing device to connect to a wireless network to enable the computing device to access the URI. The URI is a specific character string that constitutes a reference to a resource. URIs can be classified as locators (URLs), as names (URNs), or as both. The wireless access point enables the computing device to connect to a wireless network using WI-FI, BLUETOOTH, or related standards. In one example, the information indicating a wireless access point includes an authentication key configured to establish a secure connection between the computing device and the wireless network. Other examples are possible as well. The computing device may receive the information from a programming device, such as through near field communication (NFC).

At block 404, the method 400 includes downloading, onto the computing device, a provisioning software application from the URI. As discussed in more detail below, the provisioning software application is configured to provision the computing device with a set functionality.

At block 406, the method 400 includes executing the provisioning software application on the computing device, wherein the provisioning software application is configured to provision the computing device such that the provisioned computing device is configured to operate in a limited function mode. The limited function mode is configured to restrict the functionality of the computing device to a particular set of functions, based on the instructions in the provisioning software application. In one example, the computing device may further receive a checksum. The checksum may include a count of the number of bits and the value of the bits in the provisioning software application as a hashing function. The computing device may then be configured to use the hashing function to compare the count and value of the bits to the bits in the provisioning software application downloaded from the URI. If the number and value of bits in the provisioning software application downloaded from the URI does not match those provided in the checksum, the computing device may display an error message on the computing device indicating that the downloaded provisioning software application did not download properly.

In one embodiment, the limited function mode may include a list of software applications allowed on the computing device. In such an example, once the computing device is provisioned by the provisioning software application, a user could only add software applications to the computing device that are included in the list of software applications allowed on the computing device. As a specific example, the limited function mode of the provisioned computing device includes a whitelist of allowed software applications. When a user attempts to download a particular software application, the computing device compares that software application to the whitelist. If the particular software application is listed in the whitelist, the computing device may download that software application. However, if the particular software application is not listed in the whitelist, the computing device may display an error message, or otherwise refuse to download that software application.

In another embodiment, the limited function mode may include restricting a functionality of one or more software applications on the computing device. For example, a computing device may be on display at a store for potential customers to examine before purchasing. The store may want potential customers to be able to browse the internet on the computing device via a browser application. However, the store may not want potential customers to save login information, or change any default settings of the browser application. Therefore, the limited function mode may restrict the functionality of the browser application so that when a first potential customer is finished using the browser application, a second potential customer can use the browser application in the same condition as the first potential customer. Other examples are possible as well.

In yet another embodiment, the limited function mode may include preventing the removal of one or more software applications on the computing device. In such an example, the provisioning software application may be configured to install a plurality of software applications on the computing device. As a specific example, the provisioning software application may be configured to access one or more URIs to download the plurality of software applications for execution in the limited function mode. In another example, the limited function mode may include preventing adding any additional software applications to the plurality of software applications installed on the computing device.

In yet another embodiment, the limited function mode may include preventing a factory reset of the computing device. As a specific example, a company may provide a cellular phone to its employees. The cellular phone may be provisioned using the provisioning software application and may be configured to operate in a limited function mode, as discussed above. In such an example, preventing a factory reset of the computing device may prevent an employee from taking the cellular phone home and resetting the device to remove the limited function mode. By preventing a factory reset of the computing device, the provisioning software application cannot be removed from the computing device, thereby preserving the desired limited function mode.

In yet another embodiment, the provisioned computing device may include a certificate configured to grant the computing device access to a wireless access point. As a specific example, the provisioned computing device may include a certificate for access to one or more internal networks at an organization. In another embodiment, the provisioned computing device may include additional information relevant to the particular use case of the device. For example, a cellular phone for use by an employee to a company may include a contact list including telephone numbers and email address of all other employees of that company. Other examples are possible as well.

As discussed above, there are several different arrangements possible for the provisioned computing device, depending on the particular use case for that device. As such, the provisioning software application may be configured to be created and/or edited by third parties to create their individual use case. In one example, the provisioning software application may be provided to a user with options for the limited function mode and options for applications to include in the provisioned computing device. For example, a company may determine that they want the provisioned computing device they provide to their employees to have certain software applications installed on the device along with a certificate to access the company's internal network, the company wants certain software applications to have reduced functionality on the computing device, and the company wants to only allow certain software applications to be downloaded onto the computing device. The company may select those features in the provisioning software application, and then install the provisioning software application on a plurality of computing devices using the steps described above, so that each device has the same functionality.

At block 408, the method 400 includes locking the provisioned computing device to prevent changes to the limited function mode. This may be advantageous in an example where a computing device is on display at a store for potential customers to examine before purchasing. By locking the provisioned computing device and preserving the limited function mode, when a first potential customer is finished using the computing device, a second potential customer can use the computing device in the same condition as the first potential customer. Other examples are possible as well.

Using the example method 400, a programmer may use a programming device to provide the URI and wireless access point information to the computing device, and the computing device may then responsively access the URI, download the provisioning software application, execute the provisioning software application, and effectively perform a self-setup to enable the computing device to operate in a limited function mode. The method 400 may be useful, in example scenarios, where many computing devices are provisioned.

Figure 4B:
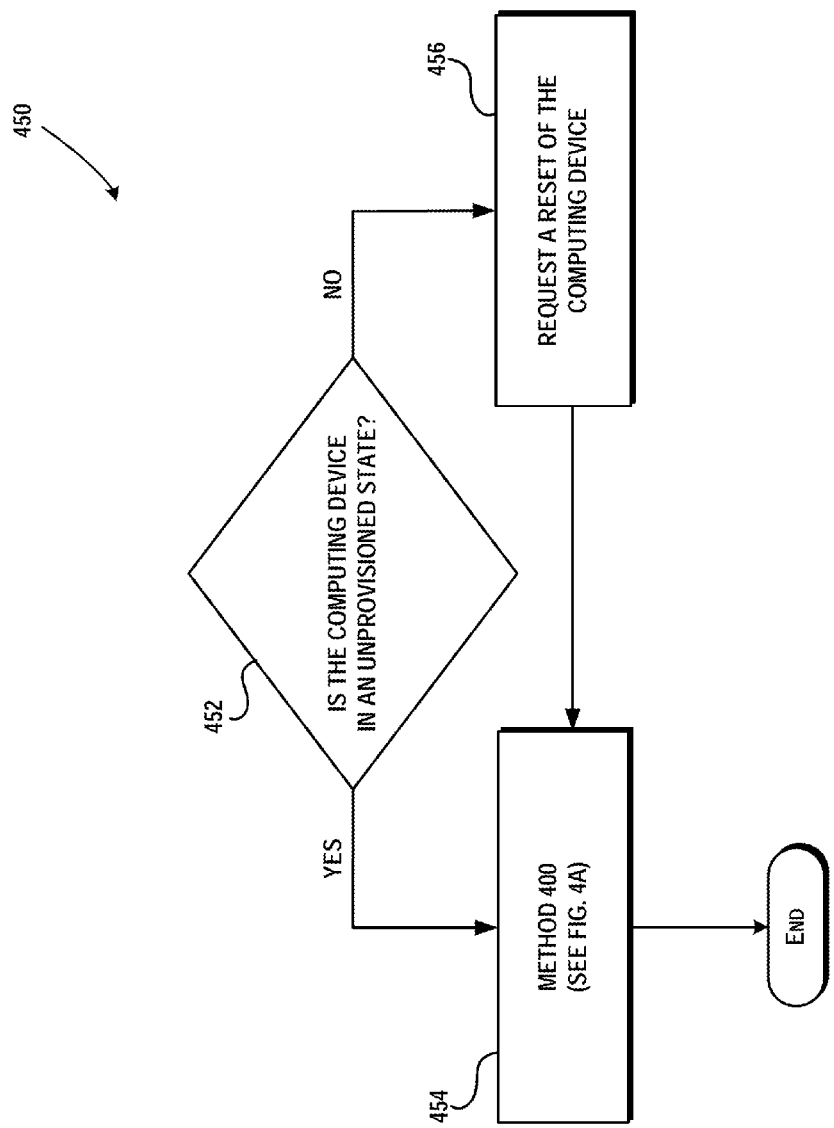
FIG. 4B is a block diagram of another example method for provisioning a computing device, in accordance with at least some embodiments described herein.

FIG. 4B is a block diagram of another example method 450, in accordance with at least some embodiments described herein. At block 452, the method 450 includes determining whether the computing device is in an unprovisioned state. An unprovisioned computing device is one that has not undergone an initial configuration, for example, a computing device right out of the box. In other examples, an unprovisioned device or a device in an unprovisioned state may include a device that has not yet been registered with a network or service provider, and is not authorized to connect to any network (and thus, cannot receive any data connection from a network). Thus, the unprovisioned device may not yet have undergone any setup procedures, or any software installations. In some examples, the unprovisioned device may not be usable since the device has not been setup and registered. The unprovisioned device may also have software installed (e.g., such as an operating system (OS) or other software applications), however, the device may not be able to execute the OS or other software applications (other than to execute to initiate setup) when in the unprovisioned state. In one example, the computing device itself may determine whether the computing device is in an unprovisioned state. In another example, another device may be configured to determine whether the computing device is in an unprovisioned state. Other examples are possible as well.

If the computing device is in an unprovisioned state, the method 450 continues at block 402 of method 400. The remaining functions 404-408 of method 400 may then be performed to provision the computing device such that the provisioned computing device is configured to operate in a limited function mode. On the other hand, if the computing device is in a provisioned state, the method 450 continues at block 456 with requesting a reset of the computing device. The reset may be configured to return the computing device to an unprovisioned state. If a user accepts the request to reset the computing device, the method 450 continues at block 402 of method 400. The remaining functions 404-408 of method 400 may then be performed to provision the computing device such that the provisioned computing device is configured to operate in a limited function mode.

FIG. 5 illustrates an example system 500 for provisioning a computing device 502. The computing device 502 may include one or more of the features of the computing device illustrated in FIGS. 1-2. Further, the computing device 502 may have an operating system, such as the operating system 300 in FIG. 3, and the computing device 502 may also have a system library accessible by the operating system. Other example configurations of the computing device are also possible.

As illustrated in FIG. 5, an example system 500 may include a computing device 502 coupled to a programming device 504 via a coupling mechanism 506. In one example, the coupling mechanism 506 may be near field communication (NFC). In another example, the coupling mechanism 506 may be or include a WI-FI, or BLUETOOTH connection. In yet another example, the coupling mechanism 506 may be a USB cable. Other potential coupling mechanisms are possible as well.

Once the computing device 502 is coupled to the programming device 504 via the coupling mechanism 506, the programming device 504 may push a payload 508 onto the computing device 506. The payload 508 may include information indicating a URI and a wireless access point configured to connect the computing device 502 to the URI. The URI is a specific character string that constitutes a reference to a resource, such as a provisioning software application 510. The wireless access point enables the computing device to connect to a wireless network 512 via a wireless interface 514, such as WI-FI, BLUETOOTH, or related standards. In one example, the information indicating a wireless access point includes an authentication key configured to establish a secure connection between the computing device 502 and the wireless network.

The computing device 502 may then be configured to download the provisioning software application 510 from the URI. The computing device 502 may then be configured to execute the provisioning software application 510 on the computing device 502. The provisioning software application 510 may be configured to provision the computing device 502 such that the provisioned computing device 502 is configured to operate in a limited function mode. The computing device 502 may then lock the provisioned computing device 502 to prevent changes to the limited function mode, as discussed above.

In one example, the payload 508 may also include a checksum. The checksum may include a count of the number of bits and the value of the bits in the provisioning software application 510 as a hashing function. The computing device 502 may then be configured to use the hashing function to compare the count and value of the bits to the bits in the provisioning software application 510 downloaded from the URI. If the number and value of bits in the provisioning software application 510 downloaded from the URI does not match those provided in the checksum, the computing device 502 may display an error message on the computing device indicating that the downloaded provisioning software application 510 did not download properly.

Figure 6:
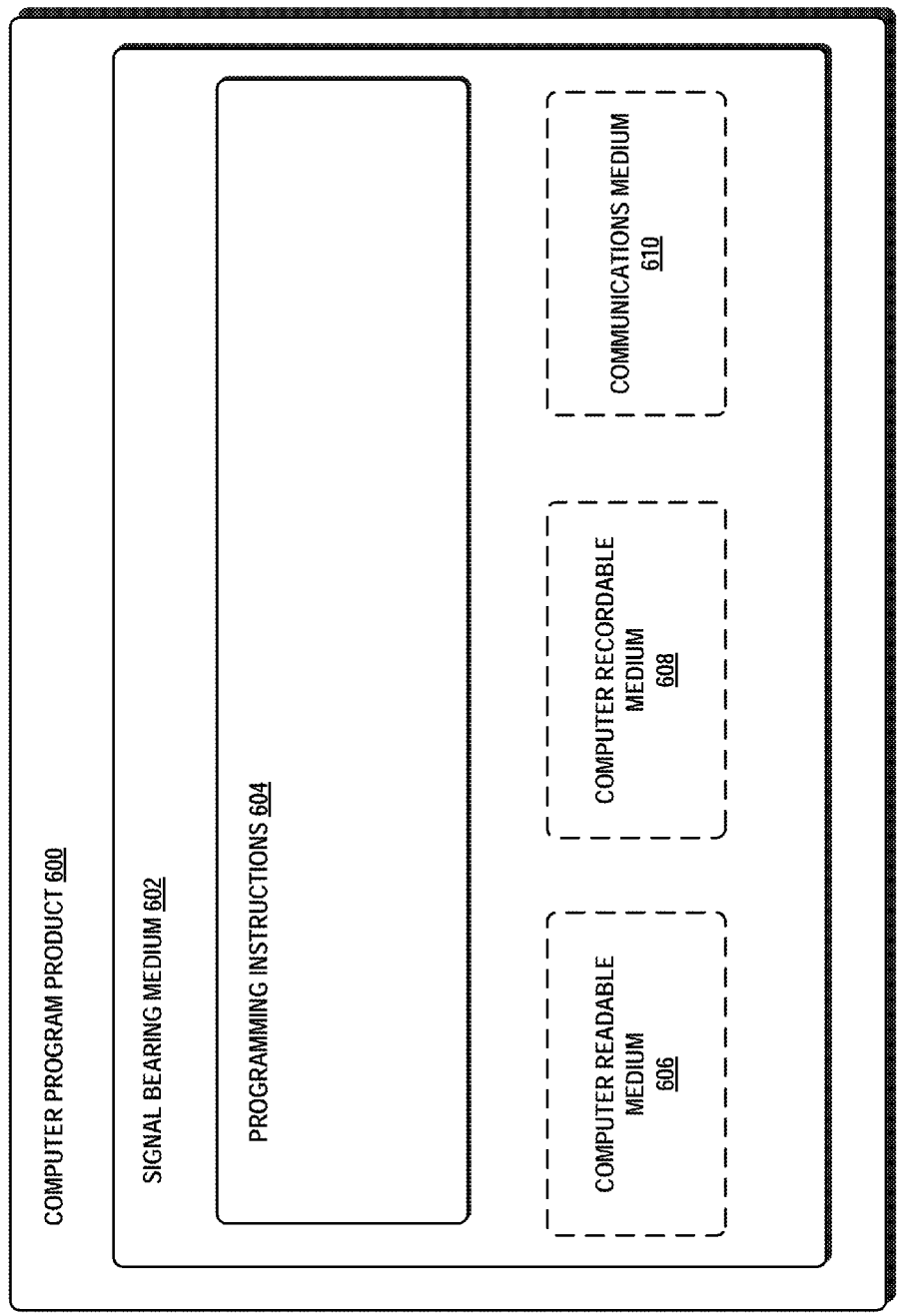
FIG. 6 illustrates an example computer-readable medium configured according to an example embodiment.

FIG. 6 illustrates a computer-readable medium configured according to an example embodiment. In example embodiments, the example system can include one or more processors, one or more forms of memory, one or more input devices/interfaces, one or more output devices/interfaces, and machine-readable instructions that when executed by the one or more processors cause the system to carry out the various functions, tasks, capabilities, etc., described above.

As noted above, in some embodiments, the disclosed methods can be implemented by computer program instructions encoded on a non-transitory computer-readable storage media in a machine-readable format, or on other non-transitory media or articles of manufacture. FIG. 6 is a schematic illustrating a conceptual partial view of an example computer program product that includes a computer program for executing a computer process on a computing device, arranged according to at least some embodiments presented herein.

In one embodiment, the example computer program product 600 is provided using a signal bearing medium 602. The signal bearing medium 602 may include one or more programming instructions 604 that, when executed by one or more processors may provide functionality or portions of the functionality described above with respect to FIGS. 1-5. In some examples, the signal bearing medium 602 can be a computer-readable medium 606, such as, but not limited to, a hard disk drive, a Compact Disc (CD), a Digital Video Disk (DVD), a digital tape, memory, etc. In some implementations, the signal bearing medium 602 can be a computer recordable medium 608, such as, but not limited to, memory, read/write (R/W) CDs, R/W DVDs, etc. In some implementations, the signal bearing medium 602 can be a communications medium 610, such as, but not limited to, a digital and/or an analog communication medium (e.g., a fiber optic cable, a waveguide, a wired communications link, a wireless communication link, etc.). Thus, for example, the signal bearing medium 602 can be conveyed by a wireless form of the communications medium 610.

The one or more programming instructions 604 can be, for example, computer executable and/or logic implemented instructions. In some examples, a computing device, such as the computing device described above in relation to FIGS. 1-3, is configured to provide various operations, functions, or actions in response to the programming instructions 604 conveyed to the computing device by one or more of the computer-readable medium 606, the computer recordable medium 608, and/or the communications medium 610.

The non-transitory computer-readable medium could also be distributed among multiple data storage elements, which could be remotely located from each other. The device that executes some or all of the stored instructions could be a client-side computing device 102 as illustrated in FIG. 1. Alternatively, the device that executes some or all of the stored instructions could be a server-side computing device 104.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method performed by a computing device, comprising:
   if the computing device is in a provisioned state, requesting a reset of the computing device;
   if the computing device is in an unprovisioned state, receiving, by the computing device, information indicating 1) a uniform resource identifier (URI) and 2) a wireless access point configured to allow the computing device to connect to a wireless network to enable the computing device to access the URI;
   downloading, onto the computing device, a provisioning software application from the URI;
   executing, by the computing device, the provisioning software application,
      wherein the provisioning software application is configured to provision the computing device such that the provisioned computing device is configured to operate in a limited function mode, and
      wherein the limited function mode comprises at least a list of software applications allowed on the computing device, restricting a functionality of one or more functions of one or more software applications on the computing device and preventing a removal of one or more software applications on the computing device; and
   locking the provisioned computing device to prevent changes to the limited function mode.

2. The method of claim 1, wherein prior to executing the provisioning software application on the computing device, the computing device is unprovisioned such that the computing device is unregistered and unable to operate in the limited function mode.

3. The method of claim 1, wherein the limited function mode of the provisioned computing device further comprises preventing any additional software applications.

4. The method of claim 1, wherein the information indicating a wireless access point includes an authentication key configured to establish a secure connection between the computing device and the wireless network.

5. The method of claim 1, wherein the limited function mode of the provisioned computing device further comprises preventing a reset of the computing device.

6. The method of claim 1, wherein the provisioned computing device further includes a certificate configured to grant the computing device access to the wireless network.

7. The method of claim 1, wherein the provisioning software application is configured to access one or more URIs to download a plurality of software applications for execution in the limited function mode.

8. A non-transitory computer readable memory storing instructions that, when executed by one or more processors of a computing device, cause the computing device to perform functions comprising:
   if the computing device is in a provisioned state, requesting a reset of the computing device;
   if the computing device is in an unprovisioned state, receiving information indicating 1) a uniform resource identifier (URI) and 2) a wireless access point configured to allow the computing device to connect to a wireless network to enable the computing device to access the URI;
   downloading, onto the computing device, a provisioning software application from the URI;

executing the provisioning software application,
  wherein the provisioning software application is configured to provision the computing device such that the provisioned computing device is configured to operate in a limited function mode, and
  wherein the limited function mode comprises at least a list of software applications allowed on the computing device, restricting a functionality of one or more functions of one or more software applications on the computing device and preventing a removal of one or more software applications on the computing device; and
locking the provisioned computing device to prevent changes to the limited function mode.

9. The non-transitory computer readable memory of claim 8, wherein prior to executing the provisioning software application on the computing device, the computing device is unprovisioned such that the computing device is unregistered and unable to operate in the limited function mode.

10. The non-transitory computer readable memory of claim 8, wherein the information indicating a wireless access point includes an authentication key configured to establish a secure connection between the computing device and the wireless network.

11. The non-transitory computer readable memory of claim 8, wherein the limited function mode of the provisioned computing device further comprises preventing a reset of the computing device.

12. The non-transitory computer readable memory of claim 8, wherein the provisioning software application is configured to access one or more URIs to download a plurality of software applications for execution in the limited function mode.

13. A system comprising:
  one or more processors; and
  data storage storing instructions that, when executed by the one or more processors, cause the system to perform functions comprising:
    if the system is in a provisioned state, requesting a reset of the system;
    if the system is in an unprovisioned state, receiving information indicating 1) an IP address, 2) a file path, and 3) a wireless access point configured to allow the system to connect to a wireless network to enable the computing device to access the file path at the IP address;
    downloading a provisioning software application from the file path at the IP address;
    executing the provisioning software application,
      wherein the provisioning software application is configured to provision the system such that the provisioned system operates in a limited function mode, and
      wherein the limited function mode comprises at least a list of software applications allowed in the system, restricting a functionality of one or more functions of one or more software applications in the system and preventing a removal of one or more software applications in the system; and
    locking the provisioned system to prevent changes to the limited function mode.

14. The system of claim 13, wherein the limited function mode of the provisioned computing device further comprises preventing any additional software applications.

15. The system of claim 13, wherein the information indicating a wireless access point includes an authentication key configured to establish a secure connection between the computing device and the wireless network.

16. The system of claim 13, wherein the limited function mode of the provisioned system further comprises preventing a reset of the system.

17. The system of claim 13, wherein the provisioning software application is configured to access one or more URIs to download a plurality of software applications for execution in the limited function mode.

* * * * *